(12) United States Patent
Kawanishi et al.

(10) Patent No.: US 11,173,844 B2
(45) Date of Patent: Nov. 16, 2021

(54) VEHICLE MIRROR DEVICE

(71) Applicants:Ichikoh Industries, Ltd., Isehara (JP); TOYOTA JIDOSHA KABUSHIKI KAISHA, Toyota (JP)

(72) Inventors: Joichi Kawanishi, Kanagawa (JP); Takuro Yuyama, Kanagawa (JP); Ryosuke Iba, Kanagawa (JP); Tomoya Matsubara, Kanagawa (JP); Yuto Watanabe, Kanagawa (JP); Takashi Nakatani, Kanagawa (JP); Tetsuya Nagasaki, Okazaki (JP); Miyuki Omori, Nagoya (JP)

(73) Assignees: Ichikoh Industries, Ltd., Isehara (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/913,001

(22) Filed: Jun. 26, 2020

(65) Prior Publication Data

US 2020/0406822 A1    Dec. 31, 2020

(30) Foreign Application Priority Data

Jun. 28, 2019 (JP) .............................. JP2019-122054

(51) Int. Cl.
*B60R 1/12* (2006.01)
*G03C 5/16* (2006.01)
*B60R 1/06* (2006.01)

(52) U.S. Cl.
CPC .............. *B60R 1/1207* (2013.01); *B60R 1/06* (2013.01); *G03C 5/164* (2013.01); *B60R 2001/1253* (2013.01)

(58) Field of Classification Search
CPC . B60R 1/1207; B60R 1/06; B60R 2001/1253; B60R 1/12; B60R 1/02;
(Continued)

(56) References Cited

U.S. PATENT DOCUMENTS

| 6,959,994 | B2 * | 11/2005 | Fujikawa | B60R 1/00 348/148 |
| 2003/0214733 | A1 * | 11/2003 | Fujikawa | B60R 1/00 359/838 |
| 2005/0243172 | A1 * | 11/2005 | Takano | H04N 7/183 348/148 |

FOREIGN PATENT DOCUMENTS

| JP | 2003-267140 A | 9/2003 |
| JP | 2003-327048 A | 11/2003 |

(Continued)

*Primary Examiner* — Bao Q Truong
(74) *Attorney, Agent, or Firm* — Oblon, McClelland, Maier & Neustadt, L.L.P.

(57) ABSTRACT

A vehicle mirror device includes a housing, an imaging device, a light projection device, and a light shield unit. The housing is attached to a side portion of a vehicle and holds a mirror. The imaging device is attached to the housing and includes an image light acquisition unit disposed in a lower surface of the housing in a vehicle-mounted state. The light projection device is attached to the housing and includes an infrared irradiation unit disposed in the lower surface of the housing and disposed side by side with the image light acquisition unit in a left-and-right direction in the vehicle-mounted state. The light shield unit is provided on the lower surface of the housing and blocks infrared light going from the infrared irradiation unit toward the image light acquisition unit.

8 Claims, 4 Drawing Sheets

(58) Field of Classification Search
CPC . G03C 5/164; F21S 41/00; F21S 41/10; F21S 41/12; F21S 41/13; F21V 41/10; F21W 2102/00; F21W 2103/00; F21W 2103/25
See application file for complete search history.

(56) References Cited

FOREIGN PATENT DOCUMENTS

| | | |
|---|---|---|
| JP | 2006-248368 A | 9/2006 |
| JP | 2016-78558 A | 5/2016 |
| JP | 2018-52486 A | 4/2018 |

* cited by examiner

VEHICLE MIRROR DEVICE

CROSS-REFERENCE TO RELATED APPLICATIONS

The present application claims priority to and incorporates by reference the entire contents of Japanese Patent Application No. 2019-122054 filed in Japan on Jun. 28, 2019.

BACKGROUND OF THE INVENTION

1. Field of the Invention

The present invention relates to a vehicle mirror device.

2. Description of the Related Art

As a vehicle mirror device, for example, a structure is known in which an imaging device acquiring image light and a light projection device emitting infrared light are arranged in a housing holding a mirror (for example, see Japanese Patent Application Laid-open No. 2016-078558).

In the structure disclosed in Japanese Patent Application Laid-open No. 2016-078558, infrared light emitted from the light projection device may be enter the imaging device, and halation may occur in an image captured by the imaging device.

The present invention has been made in view of the problem described above, and an object of the present invention is to provide a vehicle mirror device capable of suppressing occurrence of halation in an image captured by the imaging device.

SUMMARY OF THE INVENTION

According to an aspect of the present invention, a vehicle mirror device includes a housing, an imaging device, a light projection device, and a light shield unit. The housing is attached to a side portion of a vehicle and holds a mirror. The imaging device is attached to the housing and includes an image light acquisition unit disposed in a lower surface of the housing in a vehicle-mounted state. The light projection device is attached to the housing and includes an infrared irradiation unit disposed in the lower surface of the housing and disposed side by side with the image light acquisition unit in a left-and-right direction in the vehicle-mounted state. The light shield unit is provided on the lower surface of the housing and blocks infrared light going from the infrared irradiation unit toward the image light acquisition unit.

DETAILED DESCRIPTION OF THE PREFERRED EMBODIMENTS

Figure 1:
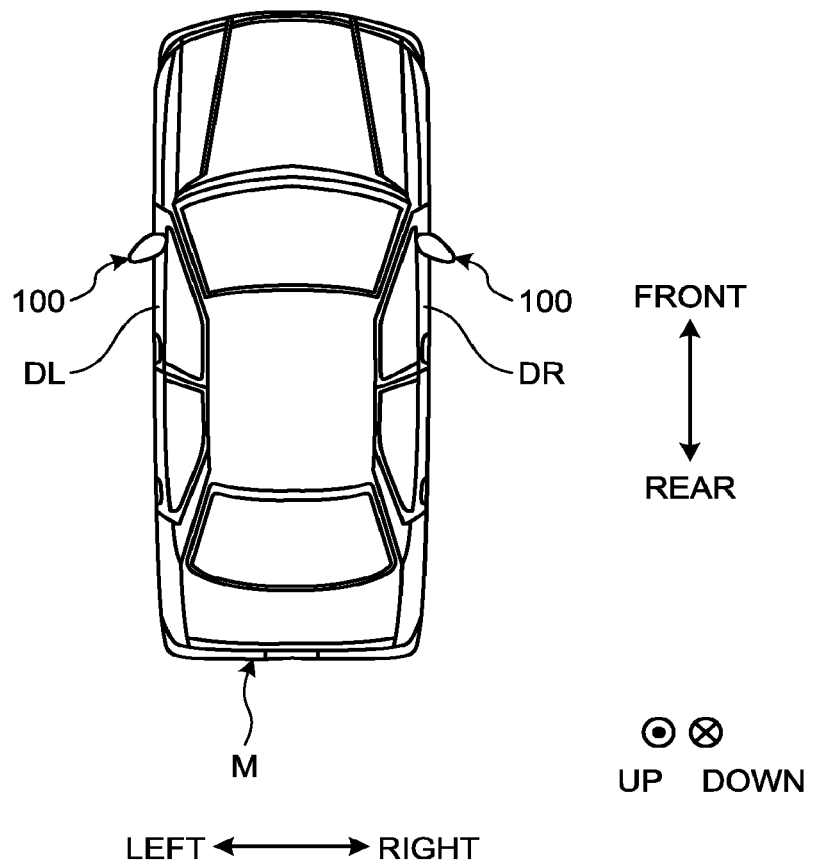
FIG. 1 is a plan view illustrating an example of a vehicle including a vehicle mirror device according to the present embodiment.

An embodiment according to the present invention will be described below with reference to drawings. The present invention is not limited to the embodiment. Constituent elements in the following embodiment include elements that can be easily replaced by those skilled in the art, or substantially the same ones.

In the following explanation, the front-and-rear direction, the up-and-down direction, and the left-and-right direction are directions in a vehicle-mounted state in which the vehicle mirror device is mounted on the vehicle, and indicate directions in the case of viewing an advancing direction of the vehicle from the driver's seat. In the present embodiment, the up-and-down direction is a direction parallel with the vertical direction, and the left-and-right direction is the horizontal direction. In the drawings, the view from top is referred to as "plan view", the view from the rear is referred to as "front view".

FIG. 1 is a plan view illustrating an example of a vehicle M including vehicle mirror devices 100 according to the present embodiment. As illustrated in FIG. 1, the vehicle mirror devices 100 are door mirrors, and attached to left and right doors DL and DR of the vehicle M outside the vehicle M. The left and right vehicle mirror devices 100 are substantially symmetrical in the left-and-right direction.

Figure 2:
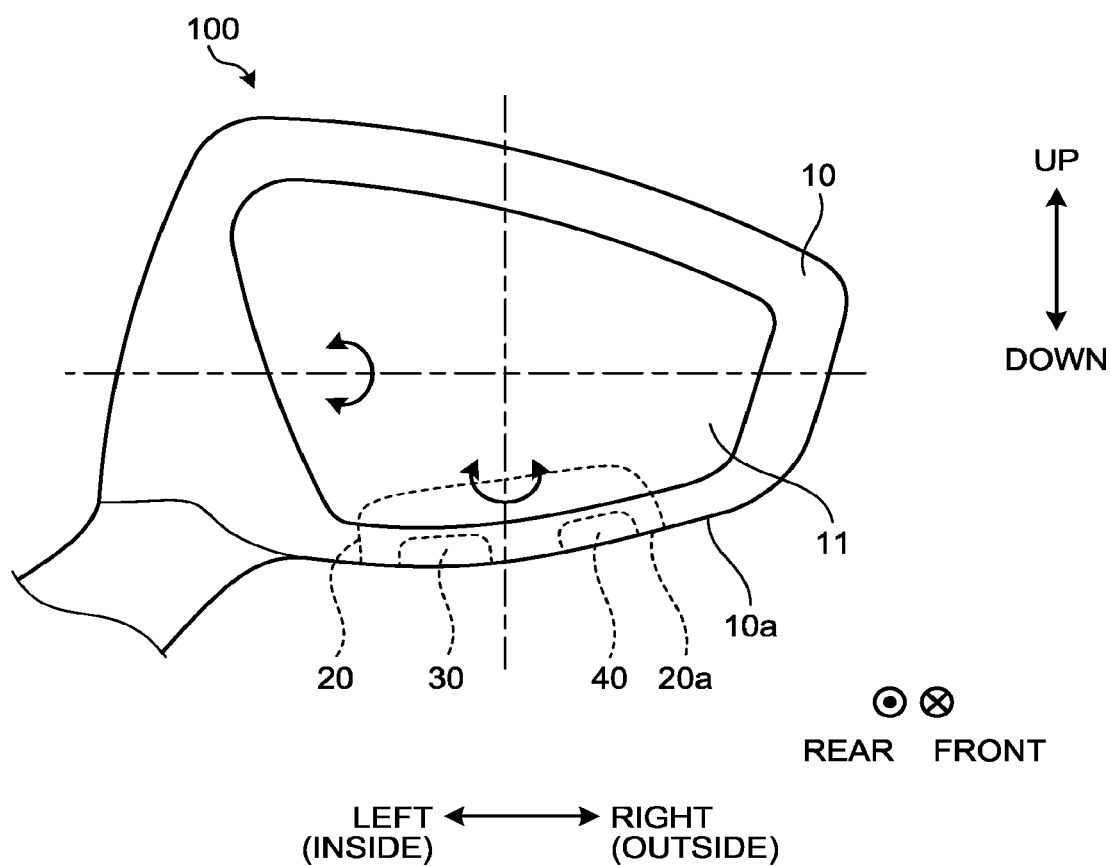
FIG. 2 is a front view of the vehicle mirror device according to the present embodiment.
Figure 3:
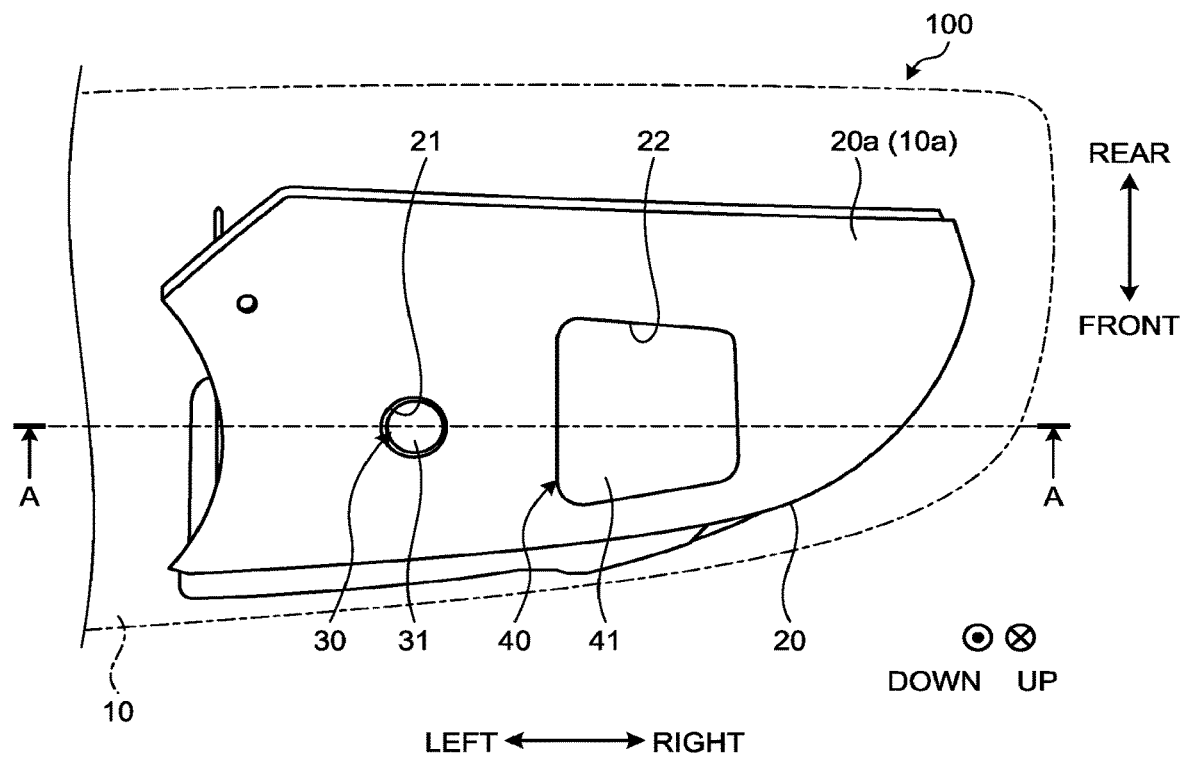
FIG. 3 is a diagram of the vehicle mirror device according to the present embodiment as viewed from the bottom.

FIG. 2 is a front view of the vehicle mirror device 100 according to the present embodiment. FIG. 3 is a diagram of the vehicle mirror device 100 according to the present embodiment as viewed from the bottom. FIG. 2 and FIG. 3 illustrate the vehicle mirror device 100 configured as a door mirror. FIG. 2 and FIG. 3 illustrate the right door mirror of the vehicle M illustrated in FIG. 1.

The vehicle mirror device 100 includes a housing 10, an attachment member 20, an imaging device 30, and a light projection device 40. The housing 10 is configured as a housing opened on the front side. The housing 10 is provided pivotably around an axis (vertical axis) parallel to the vertical with a rotation drive source (not illustrated).

The housing 10 holds a mirror 11. The mirror 11 is formed in a plate shape using, for example, glass or resin. The mirror 11 is supported by the housing 10 via a mirror drive unit (not illustrated). The mirror drive unit includes, for example, a drive source and a transmission mechanism (not illustrated), and changes the position of the mirror 11 by transmitting the driving force of the drive source to the mirror 11 with the transmission mechanism. The mirror 11 is provided rotatably around, for example, the vertical axis and an axis (horizontal axis) parallel to the horizontal direction. In this case, the horizontal axis may be, for example, an axis extending along the left-and-right direction. The housing 10 is attached to each of the left and right doors DL and DR of the vehicle M.

The attachment member 20 is attachable to and detachable from a lower portion of the housing 10 from the rear. The imaging device 30 and the light projection device 40 are fixed to the attachment member 20 with fastening members, such as screws. The attachment member 20 is attached to the housing 10, in the state in which the imaging device 30 and the light projection device 40 are fixed thereto.

The attachment member 20 includes a lower surface 20a. The lower surface 20a of the attachment member 20 is formed in a state curved upward, for example, in a direction from the vehicle inner side toward the vehicle outer side. The lower surface 20a of the attachment member 20 is in a state flush with a lower surface 10a of the housing 10. In the present embodiment, the lower surface 20a of the attachment member 20 forms part of the lower surface 10a of the housing 10. Hereinafter, the lower surface 20a of the attachment member 20 is explained as part of the lower surface 10a of the housing 10. In the present embodiment, the lower surface 10a of the housing 10 including the lower surface 20a of the attachment member 20 is formed in a state curved upward in a direction from the vehicle inner side toward the vehicle outer side. The attachment member 20 includes an opening portion 21 through which an image light acquisition unit 31 of the imaging device 30 described later is exposed, and an opening portion 22 through which an infrared irradiation unit 41 of the light projection device 40 described later is exposed.

The imaging device 30 is attached to the housing 10 via the attachment member 20. The imaging device 30 is disposed on the vehicle inner side with respect to the light projection device 40. For example, an infrared camera or the like is used as the imaging device 30. The imaging device 30 acquires an image of the surroundings of the vehicle. The imaging device 30 includes the image light acquisition unit 31 acquiring image light PR.

An optical member, such as a lens, is disposed in the image light acquisition unit 31. The image light acquisition unit 31 is disposed in a state of being exposed through the opening portion 21 formed in the lower surface 20a (lower surface 10a of the housing 10) of the attachment member 20. The image light acquisition unit 31 has a viewing angle of 180° or more, for example, with an optical axis AX1 serving as the center. The image light acquisition unit 31 is directed in a direction inclined toward the vehicle outer side with respect to the vertical direction. Specifically, the image light acquisition unit 31 is disposed such that the lower side of the optical axis AX1 is inclined toward the vehicle outer side with respect to the vertical direction.

The light projection device 40 is attached to the housing 10 via the attachment member 20. The light projection device 40 is disposed on the vehicle outer side with respect to the imaging device 30. The light projection device 40 includes the infrared irradiation unit 41 emitting infrared light IR. The infrared irradiation unit 41 is disposed in a state of being exposed through the opening portion 22 formed in the lower surface 20a (lower surface 10a of the housing 10) of the attachment member 20. The infrared irradiation unit 41 is disposed side by side with the image light acquisition unit 31 in the left-and-right direction. The infrared irradiation unit 41 emits infrared light with a predetermined irradiation angle, with an optical axis AX2 serving as the center. The optical axis AX2 of the infrared irradiation unit 41 may be disposed in a state parallel with or substantially parallel with the optical axis AX1 of the image light acquisition unit 31, or may be disposed in a state of being inclined with respect to the optical axis AX1.

As described above in regard to the positional relation between the imaging device 30 and the light projection device 40, the imaging device 30 is disposed at the position on the vehicle inner side with respect to the light projection device 40. Accordingly, in the structure in which the lower surface 10a of the housing 10 is curved upward toward the vehicle outer side, the imaging device 30 is disposed on the vehicle inner side with respect to the light projection device 40, whereby the image light acquisition unit 31 is disposed lower than the infrared irradiation unit 41. For this reason, infrared light IR emitted from the infrared irradiation unit 41 on the upper side are suppressed from directly entering the image light acquisition unit 31 directed downward.

A light shield unit 50 is provided on the lower surface 20a (lower surface 10a of the housing 10) of the attachment member 20. The light shield unit 50 blocks infrared light going from the infrared irradiation unit 41 toward the image light acquisition unit 31. The light shield unit 50 is disposed between the image light acquisition unit 31 and the infrared irradiation unit 41 on the lower surface 20a.

Figure 4:
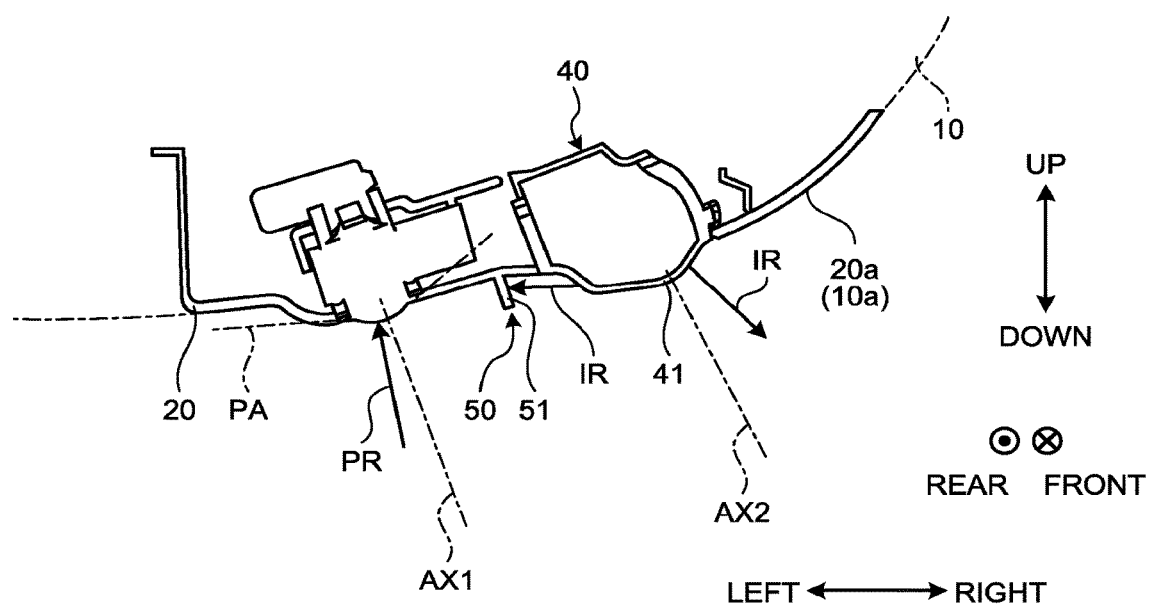
FIG. 4 is a diagram illustrating an example of a light shield unit.

FIG. 4 is a diagram illustrating an example of the light shield unit. FIG. 4 illustrates a structure along a A-A line cross section in FIG. 3. As illustrated in FIG. 4, the light shield unit 50 includes a wall portion 51. The wall portion 51 is formed between the image light acquisition unit 31 and the infrared irradiation unit 41 on the lower surface 20a of the attachment member 20. The wall portion 51 is a projecting portion projecting downward from the lower surface 20a. The wall portion 51 is perpendicular or substantially perpendicular to the lower surface 20a. The angle between the wall portion 51 and the lower surface 20a is not necessarily perpendicular or substantially perpendicular.

The wall portion 51 is in a state projecting downward in a region between the image light acquisition unit 31 and the infrared irradiation unit 41 on the lower surface 20a. The wall portion 51 is disposed on an optical path of the infrared light IR going from the infrared irradiation unit 41 toward the image light acquisition unit 31. For this reason, the wall portion 51 blocks infrared light IR going from the infrared irradiation unit 41 toward the image light acquisition unit 31, and suppresses the infrared light IR from irradiating the image light acquisition unit 31.

Figure 5:
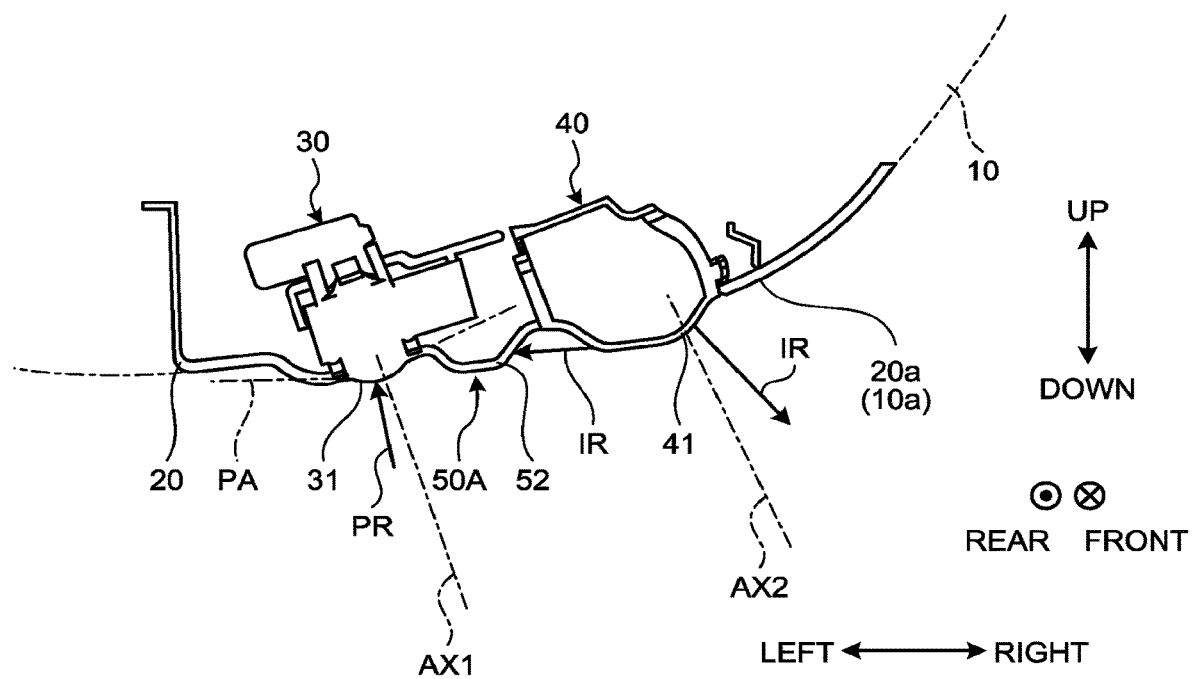
FIG. 5 is a diagram illustrating another example of the light shield unit.

FIG. 5 is a diagram illustrating another example of the light shield unit. FIG. 5 illustrates a structure along a A-A cross section in FIG. 3. As illustrated in FIG. 5, a light shield unit 50A includes a curved portion 52. The curved portion 52 is formed between the image light acquisition unit 31 and the infrared irradiation unit 41 on the lower surface 20a of the attachment member 20.

The curved portion 52 is curved in a state of projecting downward, ranging from the image light acquisition unit 31 side to the infrared irradiation unit 41 side. Specifically, the curved portion 52 is a projecting portion projecting downward from the lower surface 20a. The curved portion 52 is in a state of projecting downward in a region between the image light acquisition unit 31 and the infrared irradiation unit 41 on the lower surface 20a. The curved portion 52 is disposed on an optical path of infrared light IR going from the infrared irradiation unit 41 toward the image light acquisition unit 31. For this reason, the curved portion 52 blocks infrared light IR going from the infrared irradiation unit 41 toward the image light acquisition unit 31, and suppresses the infrared light IR from irradiating the image light acquisition unit 31.

Figure 6:
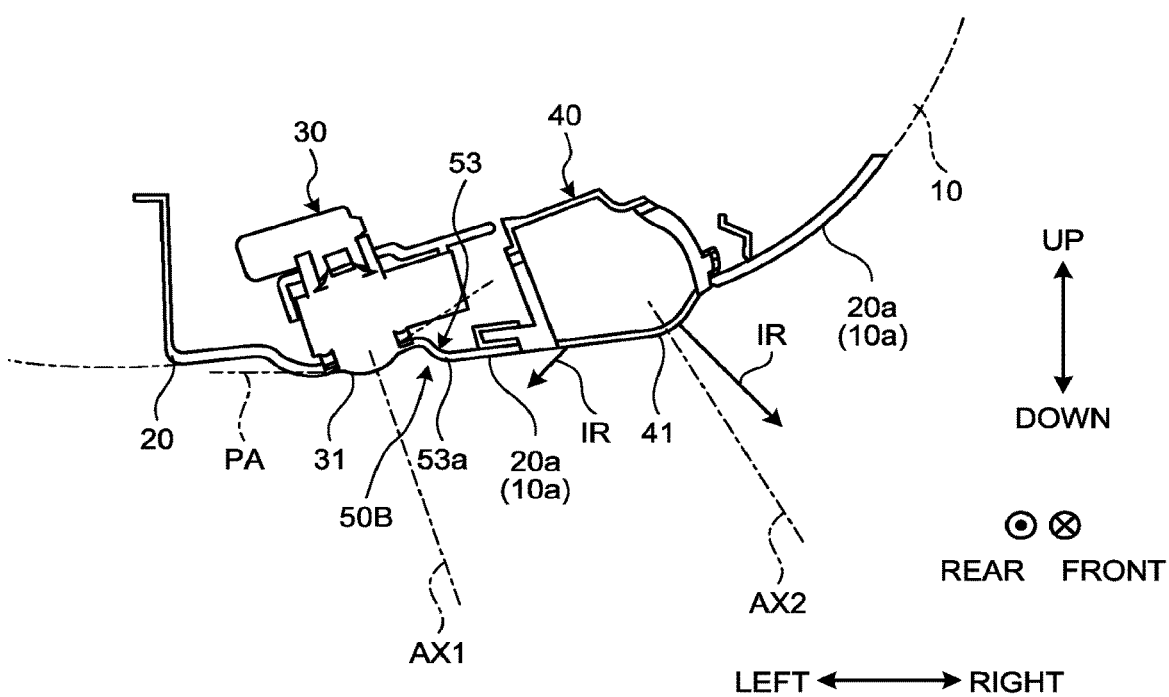
FIG. 6 is a diagram illustrating another example of the light shield unit.

FIG. 6 is a diagram illustrating another example of the light shield unit. FIG. 6 illustrates a structure along a A-A cross section in FIG. 3. As illustrated in FIG. 6, a light shield unit 50B includes a stepped portion 53. The stepped portion 53 is formed between the image light acquisition unit 31 and the infrared irradiation unit 41 in the lower surface 20a of the attachment member 20. The stepped portion 53 separates a region on the infrared irradiation unit 41 side from a region on the image light acquisition unit 31 side in the lower surface 20*a*. In addition, with the stepped portion 53, the region on the image light acquisition unit 31 side is disposed upper than the region on the infrared irradiation unit 41 side in the lower surface 20*a*.

The stepped portion 53 includes a bent portion 53*a*. The bent portion 53*a* is provided in a portion extending from the image light acquisition unit 31 side toward the infrared irradiation unit 41 side, and is bent upward in the vehicle-mounted state. The bent portion 53*a* is a projecting portion projecting downward in the vehicle-mounted state in a region between the image light acquisition unit 31 and the infrared irradiation unit 41 in the lower surface 20*a*. The bent portion 53*a* is disposed on an optical path of infrared light IR going from the infrared irradiation unit 41 toward the image light acquisition unit 31. For this reason, the bent portion 53*a* blocks infrared light IR going from the infrared irradiation unit 41 toward the image light acquisition unit 31, and suppresses the infrared light IR from irradiating the image light acquisition unit 31.

In the examples illustrated in FIG. 4 and FIG. 5, although the surface of the infrared irradiation unit 41 is curved in two portions of the vehicle outer side and the vehicle inner side, the vehicle inner side portion in the surface of the infrared irradiation unit 41 may be provided in a flat shape as in the example illustrated in FIG. 6. This structure suppresses emission of infrared light from the infrared irradiation unit 41 toward the image light acquisition unit 31.

A controller (not illustrated) is mounted in the vehicle M. The controller includes a microprocessor, such as a central processing unit (CPU), a memory, such as a read only memory (ROM) and a random access memory (RAM), and storage. The controller controls operations of the vehicle mirror device 100 overall. For example, the controller controls a rotation driving operation for the housing 10 described above, a position changing operation for the mirror 11, an imaging operation with the imaging device 30, and a light projection operation with the light projection device 40.

The following is an explanation of operations of the vehicle mirror device 100 structured as described above. For example, in the state in which the vehicle mirror device 100 is disposed in an opened position, when a predetermined operation (such as changing the shift lever to a reverse position to park the vehicle in a parking lot) is performed in the vehicle, the controller of the vehicle M causes the imaging device 30 to start acquisition of image light PR, and causes the light projection device 40 to start emission of infrared light IR.

The infrared light IR emitted from the infrared irradiation unit 41 of the light projection device 40 is emitted, for example, radially from the lower surface 10*a* of the housing 10, and irradiates the surroundings of the housing 10. In the image light acquisition unit 31, the imaging device 30 acquires, as the image light PR, reflected light of the infrared light IR with which the surroundings of the housing 10 is irradiated. The acquired image light PR is transmitted from the imaging device 30 to the controller, and displayed as an image on a display unit or the like in the vehicle.

Part of the infrared light IR emitted from the infrared irradiation unit 41 may go to the image light acquisition unit 31 of the imaging device 30. In addition, the lower side of the optical axis AX1 of the image light acquisition unit 31 is inclined toward the vehicle outer side, that is, the infrared irradiation unit 41 side. In this case, the infrared light IR emitted from the infrared irradiation unit 41 may directly enter the image light acquisition unit 31. Halation may occur when the infrared light IR directly enters the image light acquisition unit 31.

In the present embodiment, the light shield unit 50, 50A, or 50B is provided on the lower surface 10*a* of the housing 10. Accordingly, the light shield unit 50, 50A or 50B enables blocking of the infrared light IR going toward the image light acquisition unit 31 from the infrared irradiation unit 41. This structure suppresses the infrared light IR from directly entering the image light acquisition unit 31.

As described above, the vehicle mirror device 100 according to the present embodiment includes the housing 10, the imaging device 30, the light projection device 40, and the light shield unit 50. The housing 10 is attached to a side portion of the vehicle M and holds the mirror 11. The imaging device 30 is attached to the housing 10 and includes the image light acquisition unit 31 disposed in the lower surface 10*a* of the housing 10 in the vehicle-mounted state. The light projection device 40 is attached to the housing 10 and includes the infrared irradiation unit 41 disposed in the lower surface 10*a* of the housing 10 and disposed side by side with the image light acquisition unit 31 in the left-and-right direction in the vehicle-mounted state. The light shield unit 50 is provided on the lower surface 10*a* of the housing 10 and blocks infrared light IR directed from the infrared irradiation unit 41 toward the image light acquisition unit 31.

This structure suppresses infrared light IR from directly entering the image light acquisition unit 31 by blocking infrared light IR going toward the image light acquisition unit 31 from the infrared irradiation unit 41 with the light shield unit 50. This structure enables suppression of occurrence of halation in an image captured by the imaging device 30.

In the vehicle mirror device 100 according to the present embodiment, the light shield unit 50 is disposed between the image light acquisition unit 31 and the infrared irradiation unit 41 on the lower surface 10*a* of the housing 10. This structure enables secure shielding of infrared light IR between the image light acquisition unit 31 and the infrared irradiation unit 41.

In the vehicle mirror device 100 according to the present embodiment, the light shield unit 50 includes a projecting portion in which part of the lower surface 10*a* of the housing 10 projects downward in the vehicle-mounted state. This structure enables secure shielding of infrared light IR with the projecting portion projecting downward.

In the vehicle mirror device 100 according to the present embodiment, the light shield unit 50 includes a stepped portion 53 formed between the image light acquisition unit 31 and the infrared irradiation unit 41 on the lower surface 10*a* of the housing 10. This structure enables secure shielding of infrared light IR in the stepped portion 53.

In the vehicle mirror device 100 according to the present embodiment, the imaging device 30 and the infrared light projection device 40 are formed in a state flush with the lower surface 10*a* of the housing 10. This structure secures good appearance of the lower surface 10*a* while suppressing occurrence of halation in an image captured by the imaging device 30.

The technical range of the present invention is not limited to the embodiment described above, but may be properly changed within a range not departing from the gist of the present invention. For example, the embodiment described above illustrates the structure in which the imaging device 30 and the light projection device 40 are attached to the housing 10 via the attachment member 20 as an example, but the structure is not limited thereto. The imaging device 30 and the light projection device 40 may be directly attached to the housing 10.

In addition, the embodiment described above illustrates the structure in which the imaging device 30 is disposed on the vehicle inner side with respect to the light projection device 40 as an example, but the structure is not limited thereto. The structure may be a structure in which the imaging device 30 is attached on the vehicle outer side with respect to the light projection device 40. Specifically, the position of the imaging device 30 and the position of the light projection device 40 may be reversed.

The present invention provides a vehicle mirror device capable of suppressing occurrence of halation in an image captured by an imaging device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle mirror device, comprising:
    a housing attached to a side portion of a vehicle and holding a mirror;
    an imaging device attached to the housing and including an image light acquisition unit disposed in a lower surface of the housing in a vehicle-mounted state;
    a light projection device attached to the housing and including an infrared irradiation unit disposed in the lower surface of the housing and disposed side by side with the image light acquisition unit in a left-and-right direction in the vehicle-mounted state; and
    a light shield unit provided on the lower surface of the housing and blocking infrared light going from infrared irradiation unit toward the image light acquisition unit, wherein the light shield unit includes a projecting portion that projects downward from the lower surface in the vehicle-mounted state.

2. The vehicle mirror device according to claim 1, wherein the light shield unit is disposed between the image light acquisition unit and the infrared irradiation unit on the lower surface of the housing.

3. The vehicle mirror device according to claim 1, wherein the projecting portion includes a stepped portion formed between the image light acquisition unit and the infrared irradiation unit in the lower surface of the housing.

4. The vehicle mirror device according to claim 1, wherein the imaging device and the light projection device are formed in a state flush with the lower surface of the housing.

5. The vehicle mirror device according to claim 1, wherein the projection portion includes a wall portion formed between the image light acquisition unit and the infrared irradiation unit on the lower surface.

6. The vehicle mirror device according to claim 1, wherein the projecting portion includes a curved portion projecting downward in a region between the image light acquisition unit and the infrared irradiation unit on the lower surface.

7. The vehicle mirror device according to claim 3, wherein the stepped portion includes a bent portion provided in a portion extending from an image light acquisition unit side toward an infrared irradiation unit side.

8. The vehicle mirror device according to claim 7, wherein the bent portion is bent upward in the vehicle-mounted state.

* * * * *